United States Patent [19]

Bennett

[11] Patent Number: 4,474,358
[45] Date of Patent: Oct. 2, 1984

[54] VALVES

[76] Inventor: Arthur M. Bennett, 19 Saddleback Rise, Murrays Bay, Auckland, New Zealand

[21] Appl. No.: 315,433
[22] Filed: Oct. 27, 1981
[51] Int. Cl.³ .............................................. F16K 1/00
[52] U.S. Cl. .............................. 251/357; 251/DIG. 1
[58] Field of Search .......................... 251/DIG. 1, 357

[56] References Cited

U.S. PATENT DOCUMENTS

| Re. 17,022 | 7/1928 | Wilson | 251/357 |
|---|---|---|---|
| 2,417,494 | 3/1947 | Hoof | 251/332 |
| 2,658,716 | 11/1953 | Winfree | 251/273 |
| 2,678,187 | 5/1954 | Peters | 137/625.66 |
| 2,894,718 | 7/1959 | Englert | 251/357 |
| 2,971,090 | 2/1961 | Piet et al. | 137/625.64 |
| 3,198,481 | 8/1965 | Bryant | 251/210 |
| 3,612,479 | 10/1971 | Smith, Jr. | 251/176 |
| 3,945,607 | 3/1976 | Dashner | 251/357 |
| 3,996,965 | 12/1976 | Peters | 137/625.64 |

FOREIGN PATENT DOCUMENTS

| 621664 | 8/1962 | Belgium . | |
| 2747715 | 2/1979 | Fed. Rep. of Germany | 251/DIG. 1 |
| 884529 | 12/1961 | United Kingdom . | |

Primary Examiner—A. Michael Chambers
Attorney, Agent, or Firm—Young & Thompson

[57] ABSTRACT

A seal for a valve such as a faucet, has an annular body in which a resilient "O" ring is trapped on the main face by a frusto-conical wedging member. The seal may be a movable valve member (jumper) or may be a separate washer with a portion of the "O" ring protruding from the main face.

The main "O" ring functions as the main seal against a flat or ridged valve seat of a faucet or other valve.

6 Claims, 5 Drawing Figures

VALVES

PRIOR ART

The following patents illustrate the use of resilient members such as "O" rings as valve seals.

U.S. Pat. No. 2,417,494
U.S. Pat. No. 2,658,716
U.S. Pat. No. 2,678,187
U.S. Pat. No. 2,894,718
U.S. Pat. No. 2,971,090
U.S. Pat. No. 3,198,481
U.S. Pat. No. 3,612,479
U.S. Pat. No. 3,996,965
Belgian Pat. No. 621,664
U.K. Pat. No. 884529 (equivalent to Swedish Pat. No. 194322) U.S. Pat. No. 2,417,494 and U.S. Pat. No. 2,678,187 teach the use of an "O" ring as the main sealing element clamped in the face of a valve member by means of a screw and a clamping member.

Figure 3:
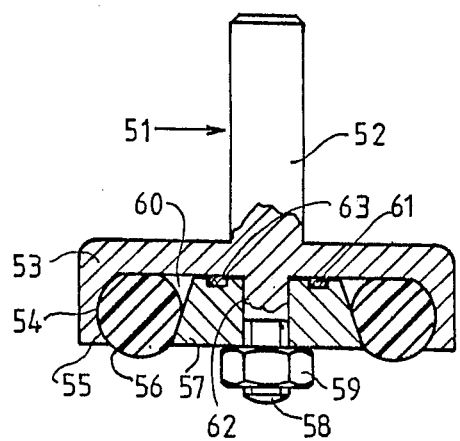

FIG. 3 of the Belgian patent teaches the use of an "O" ring clamped within a cavity by a conical headed fastener and provides a relief passage 8 between the cavity and the rear of the valve member. In the two U.S. patents first mentioned, the "O" ring is allowed to protrude from the sealing face of the valve member. In U.K. Pat. No. 884529, the "O" ring is held within a cavity, of such a size that the "O" ring is maintained within the cavity and does not protrude therefrom. This suffers from the disadvantage that dirt may be trapped within the cavity creating damage to the "O" ring with consequent risk of loss of seal.

The present invention teaches a novel sealing means suitable for faucets.

The invention relates to valves, and has particular application to valve members for use within valves such as faucets, screw down valves and the like, for liquids or gases.

Hitherto valves for fluid control have generally utilized replaceable annular washers of hard but somewhat resilient material such as nylon, rubber or the like adapted to seal against a ridged valve seat. Such washers deteriorate in use, and require higher and higher pressures to effect a seal so that the ridged seat cuts into the face of the washer.

Readers will be familiar with the problems encountered with this type of washer in domestic faucets. With larger valves, valve spanners are often used to exert high torque to close off the valve as the washer deteriorates. This often damages the valve stem or valve body as well as seriously damaging the washer, and exacerbates the problem.

Moreover they have a tendency to leak under high pressures with fluid leaking around the edge of the washer, or along the shank to which the washer is attached. The ridged seat is also undesirable.

It is an object of this invention to provide an improved valve member or one which will at least provide the user with a useful choice.

In one aspect, the invention provides a valve member including a body having a sealing face, a cavity in said sealing face, a resilient sealing member positioned in said cavity and having a portion protruding from the sealing face, and a wedge member adapted to hold said sealing member in place.

The valve member in accordance with this invention may be formed as a replaceable washer for attachment to the backing plate of a jumper or the like, or alternatively, the valve member may be formed in one piece with the jumper. This will be apparent from the various embodiments of the invention described hereafter.

Figure 1:
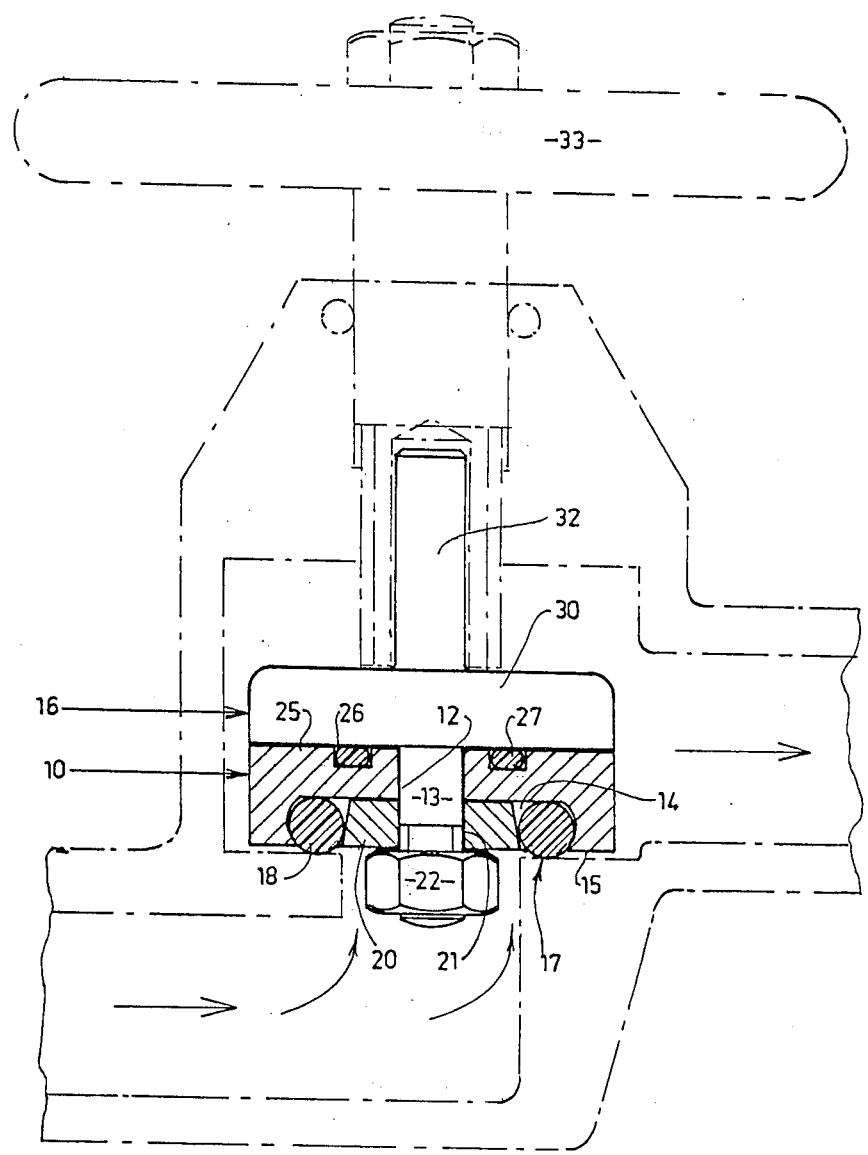

Other aspects of this invention which should be considered in all its novel aspects, will become apparent from the following description, which is given by way of example only, with reference to the accompanying drawings, in which:

FIG. 1: illustrates the valve member as a removable washer and its position in relation to a valve which is shown in broken lines.

Figure 2:
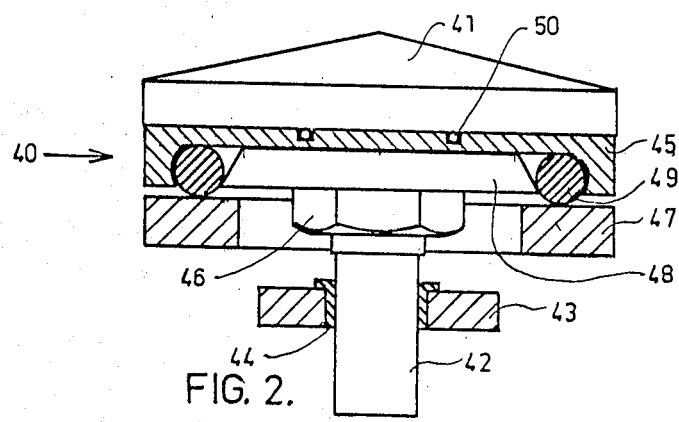

FIG. 2: illustrates a screw down valve having a replaceable washer.

FIG. 3: illustrates the valve member as a composite jumper.

Figure 4:
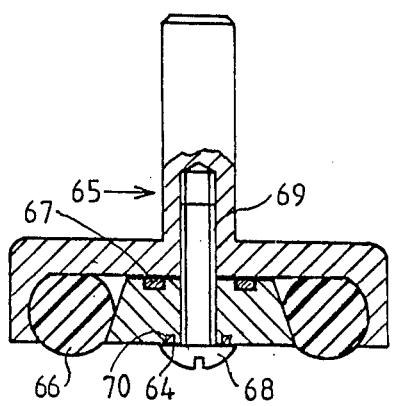

FIG. 4: illustrates a modified jumper.

Figure 5:
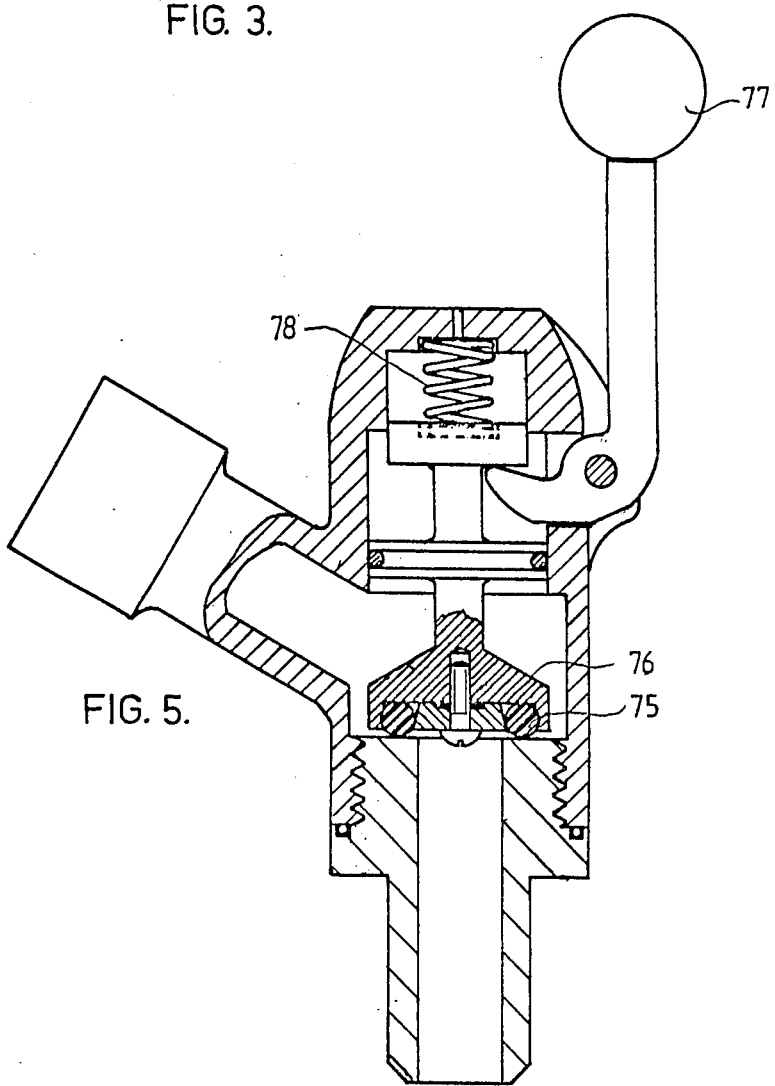

FIG. 5: illustrates a spring-loaded tap of the type used to dispense liquids.

The valve member of this invention may be constructed as an apertured washer for attachment to a backing plate, as shown in FIGS. 1 and 2, or they may be formed as part of the movable valve member, as shown in FIGS. 3 to 5.

Turning now to FIG. 1, an annular washer 10 has an aperture 12 therethrough adapted to receive a fastener 13 to attach it to a backing plate of a jumper 16.

A cavity 14 is provided in the sealing face 15 of the washer 10, i.e. in the face 15 which will contact a valve seat 17. The cavity 14 has a recessed side wall which is preferably curved as shown. A resilient annular member 18 is positioned in said cavity, with a portion protruding therefrom.

Preferably, the resilient member is a rubber "O" ring and sits within the circular cavity 14, with the "O" ring in contact with the curved side wall of the cavity. Holding means 20, in the form of a wedge is positioned within the cavity so as to hold the "O" ring in place. As shown, the wedge is frusto-conical, although other shapes can be used in conjunction with the size and shape of the "O" ring and cavity. Conveniently, the wedge 20 has an aperture 21 therethrough through which the fastener 13 can pass. As shown in FIG. 1, the fastener 13 is a threaded stem forming part of the valve member 16 so that the wedge can be held in place by a nut 22 or the like attached to the stem 13. Conversely, the fastener 13 may be a screw or the like passing through apertures 21 and 13 and into engagement with a threaded socket in the valve member 16 to thereby clamp the wedge in place.

In addition, the rear face 25 of the washer is provided with an annular groove 26 in which a secondary "O" ring 27 is provided. Preferably, the secondary "O" ring is seated almost entirely within this annular groove and more preferably, about 75% of the height of the "O" ring is situated in the groove, with about 25% of the ring protruding from the rear face 25.

To install the washer 10 it is inserted over stem 13 so that it contacts the backing plate 30 of the jumper 16, as shown in FIG. 1 and the nut 22 is inserted on the stem and tightened to thereby clamp the wedge against "O" ring 18 and the washer against the backing member 30. This also results in the secondary "O" ring 27 being clamped between the groove 26 and the backing plate 30 as shown in FIG. 1.

The size of the cavity 14 and the main "O" ring is such that the main "O" ring will contact a valve seat 17 when the valve is closed. The jumper 16 has a spigot 32 which is in turn moved by a valve head 33.

In use, with the washer situated as shown in the drawings, a good seal can be provided when the valve is closed as the resilience of the protruding main "O" ring 18 and provides a main seal against the valve seat 17, and it is not necessary to provide a ridge seat at 17. Although conversely, the protruding "O" ring can be used to seal against a ridge seat, if for example the washer 10 is fitted as a replacement to an existing valve having a ridge seat. The secondary "O" ring assists in preventing leakage of fluid down the centre of the washer as any fluid which leaks down the stem 13 will be trapped by the secondary "O" ring which is clamped between the rear face 25 of the washer and the backing plate 30.

Turning now to FIG. 2, there is shown a screw down non-return valve 40, having a backing plate 41 to which a threaded stem 42 is attached. This stem 42 passes through a valve guide 43, which is preferably provided with a non-metallic bush, e.g. a nylon bush 44. A washer 45, as previously described, is attached to the backing plate 41 by means of a nut 46. Thus, the washer is positioned so as to seal against a valve seat 47. The wedge 48 holds the main "O" ring 49 in place with a portion thereof protruding from the sealing face to engage the valve seat 47. In addition, a secondary "O" ring 50 is provided in the rear face of the washer so as to be sandwiched between the washer and the backing plate 41.

For larger washers, an additional secondary "O" ring can be provided in a groove on the rear face of the washer corresponding to the position of the main "O" ring.

Marine and industrial screw down valves commonly have a mitred bronze valve engaging against a bronze valve seat. This suffers from the disadvantage that the mitred bronze valve face is prone to mechanical wear, and also suffers from electrolysis from metal to metal contact within the valve in the presence of sea water. These disadvantages can be minimised by the valve shown in FIG. 2, as the main seal is achieved by main "O" ring 49 which is a resilient material such as nitrile rubber or viton, sealing against the metal valve seat 47. In addition, metal to metal contact between the valve stem 42 and the valve guide 43 can be eliminated by the use of a nylon bush in the valve guide.

By clamping the secondary "O" ring 50 between the washer and the backing plate, its resilient nature tends to act as a spring washer thereby resisting unscrewing of the nut 46. The main advantage of this valve, is the resilient primary seal effected by the "O" ring 49, as very little pressure is required to provide a good seal. In addition, maintenance of the valve is simple, as the "O" ring 49 can be quickly and easily replaced. It is believed that the valve of this invention will minimise valve "chatter" as the "chatter" will be taken up by the resilient "O" ring. Indeed, if valve "chatter" does occur, the resilient nature of the "O" ring 49 will prevent damage to the valve seat.

Again, the resilient nature of the "O" ring 49 will tend to minimise underwater shock, and will also assist in minimising noise of the valve in operation. This is advantageous in naval use, as in the event of a submarine attack, it is not practical for a surface vessel to stop all of its reciprocating pumping machinery, and thus valve noise in pumping machinery is undesirable.

FIG. 3 shows a jumper 51 which can be used in place of the jumper 16 and washer 10 of FIG. 1. This jumper 51 has a one piece body having a spigot 52 and a valve head 53 containing a cavity 54 in its main sealing face 55. The cavity 54 contains an "O" ring 56, and a frusto-conical wedge member 57 as previously described. The side wall of the cavity 54 is curved in two directions, so as to accommodate the "O" ring. A threaded stud 58 protrudes from the jumper, and a nut 59 is used to clamp the wedge member 57 against the base of the cavity. A relieving space 60 is left within the cavity and is partly bounded by the "O" ring 56 and the wedge member 57.

A circumferential seal 61 is positioned between the relieving space 60 and an aperture 62 passing through the wedge member. Preferably, this seal takes the form of a further "O" ring 61 mounted in an annular groove 63 at the base of the wedge member, with the "O" ring protruding slightly in its relaxed state, so as to be sandwiched between the base of the wedge member and the base of the cavity. This circumferential seal 61 thus serves to minimise the leakage of pressurised fluid into the relieving space 60. This is desirable for reasons of hygiene and also for valve members required to operate under high pressures.

FIG. 4 shows a similar jumper 65 having a main "O" ring 66, a further "O" ring 67, and a fastener in the form of a screw 68 engaged with a threaded socket 69 within the jumper. Conveniently, the screw 68 has a rounded head, and has an additional circumferential seal 69 in the form of an "O" ring 69 mounted within a groove 70 in the main face of the wedge member just under the head of the screw 68. It will be apparent that this can be used in place of the "O" ring 67, or in addition thereto. It has the further advantage that such an "O" ring 69 tends to act as a spring washer to hold the screw 68 in place.

FIG. 5 illustrates a spring-loaded tap of the type used for dispensing liquid such as beer. In this case, the main "O" ring 75 is mounted so as to protrude from the face of the movable valve member 76. The valve member being operated by a lever 77 against the bias of a spring 78.

All of the illustrated embodiments show a main "O" ring held in place by a frusto-conical wedge member. This has the advantage that the protruding "O" ring is deformed by the pressure of the wedge member, and thus the properties of the "O" ring can be adjusted by adjusting the pressure on the wedge member and thus the amount of deformation of the "O" ring. It has been found that the combination of the frusto-conical wedge with the shaped side wall of the cavity enables an "O" ring to be held in place on the main sealing face of the valve member.

For most applications, the wedge member will be apertured and held against the valve member by a fastener, such as a nut or a stud, a screw or a spring clip or a stud. In which case, the security of the "O" ring in high pressure operations, is facilitated by the presence of a circumferential seal (61, 67, 69), between the relieving space and the aperture in the fastener. This circumferential seal is provided about the aperture to minimise fluid communication between the exterior of the valve member and the relieving space.

Nevertheless, the wedge need not be apertured to hold the "O" ring in place. The wedge could, for example, be the head of a specially shaped screw equivalent to the wedge and screw of FIG. 4. Alternatively, the wedge could be attached or fused to the base of the cavity by an adhesive, friction welding, or internal clip, or by a blind rivet.

The valves shown in the drawings are shown with flat valve seats. This is because the protruding "O" ring of the valve member of this invention does not require the presence of a ridged valve seat. However, the valve member of this invention can be used with a ridged valve seat, e.g. in a conventional faucet, as the valve member can be provided with an "O" ring of similar diameter to that of the existing ridged seat.

However, it will be appreciated that faucets having ridged seats are prone to wear, and it is often necessary to refurbish these seats. Moreover, the manufacture of valves such as faucets having ridged seats is now unnecessary if the faucet is to be used with a washer in accordance with this invention.

The wedge and body of the valve member may be formed of any suitable material. For example, the body may be formed of a plastics material, e.g. acetyl, or of a metal. Suitable metals would be bronze, monel, or stainless steel, the particular material being chosen depending upon the materials with which the valve was to be used. The "O" rings are formed of resilient material, e.g. rubber.

By choosing a resilient material having a suitable temperature range, it is possible to design a valve member capable of working with most liquids over different temperature ranges. For example, nitrile rubber "O" rings have a working range of minus 65° F. to plus 300° F. This will enable a washer having a nylon or bronze body in conjunction with a nitrile rubber "O" ring to work with low pressure saturated steam installation as well as with hot and cold domestic water systems. By choosing an "O" ring manufactured from viton, and by utilizing a bronze or stainless steel body, the temperature range can be increased up to 450° F. This would enable the valve member to be used with a high pressure saturated steam system, which would be suitable for most industrial and marine requirements. These choices of material are given by way of example only, and it will be appreciated that other materials may be chosen to extend the working range of the valve member.

Finally, it will be appreciated that various alterations or modifications may be made to the foregoing without departing from the scope of this invention, as exemplified by the following claims.

I claim:

1. In a valve member suitable for use with a flat valve seat, said member including a body having a sealing face, a cavity in said sealing face defined by a recessed side wall and a base, a resilient sealing member positioned in said cavity and a wedge member adapted to hold said resilient member in place; the improvement in which the wedge member has at least an outer zone substantially flush with the sealing face of said body, and the wedge member substantially fills the center of said cavity leaving a peripheral chamber of volume less than the relaxed volume of said resilient sealing member, said wedge member clamping and compressively deforming said resilient sealing member between the wedge member and the recessed side wall of said cavity, whereby a portion of said resilient member protrudes substantially beyond said sealing face and said outer zone of said wedge member, said sealing member being an "O" ring, the cavity being circular and said recessed side wall being curved in two directions to receive the "O" ring, the wedge member having an aperture therein to allow a fastener to clamp it to the body without rotation of said wedge member with respect to said body, said valve member being an apertured washer or disc seal adapted to be mounted on a backing plate, said valve member having an annular groove on a rear face of said body containing a further "O" ring capable of being sandwiched between said body and said backing plate.

2. A valve member as claimed in claim 1, wherein its relaxed state about 25% of the height of the further "O" ring protrudes from the rear face of the body.

3. A valve having a valve seat and a valve member movable toward and away from said valve seat, wherein said valve member is as claimed in claim 1.

4. A valve as claimed in claim 3 wherein said valve seat is substantially flat.

5. A valve member as claimed in claim 1, and screw means releasably holding the wedge member in compression against said resilient sealing member, whereby the pressure exerted by the resilient sealing member against the wedge member is transmitted to the screw means thereby to impede unscrewing of the screw means.

6. A valve member as claimed in claim 1, in which about 75% of the height of the resilient sealing member is disposed in said peripheral chamber and about 25% of the height of the resilient sealing member protrudes beyond the chamber.

* * * * *